US 9,554,106 B2

(12) United States Patent
Sagawa et al.

(10) Patent No.: US 9,554,106 B2
(45) Date of Patent: Jan. 24, 2017

(54) PROJECTOR AND METHOD FOR CONTROLLING PROJECTOR

(71) Applicant: Seiko Epson Corporation, Tokyo (JP)

(72) Inventors: Takahiro Sagawa, Chino (JP); Bi Shi, Fuchu (JP)

(73) Assignee: Seiko Epson Corporation, Tokyo (JP)

( * ) Notice: Subject to any disclaimer, the term of this patent is extended or adjusted under 35 U.S.C. 154(b) by 766 days.

(21) Appl. No.: 13/718,550

(22) Filed: Dec. 18, 2012

(65) Prior Publication Data

US 2013/0162917 A1 Jun. 27, 2013

(30) Foreign Application Priority Data

Dec. 27, 2011 (JP) ................................. 2011-284757

(51) Int. Cl.
  *H04N 9/31* (2006.01)
  *G09G 3/34* (2006.01)
  *G09G 3/36* (2006.01)

(52) U.S. Cl.
  CPC .......... *H04N 9/3194* (2013.01); *G09G 3/3413* (2013.01); *G09G 3/36* (2013.01); *H04N 9/3105* (2013.01); *H04N 9/3144* (2013.01); *H04N 9/3155* (2013.01); *G09G 2320/0252* (2013.01); *G09G 2320/0271* (2013.01); *G09G 2320/041* (2013.01); *G09G 2320/0626* (2013.01); *G09G 2340/16* (2013.01)

(58) Field of Classification Search
  CPC .. G09G 3/3648; G09G 3/3413; H04N 9/3194; H04N 9/3105
  USPC ....................................................... 349/5–10
  See application file for complete search history.

(56) References Cited

U.S. PATENT DOCUMENTS

| 6,488,380 | B1 | 12/2002 | Fujimori |
| 6,866,389 | B2 * | 3/2005 | Ito et al. ......................... 353/119 |
| 2002/0063160 | A1 * | 5/2002 | Krichever et al. ........ 235/462.32 |
| 2005/0179854 | A1 * | 8/2005 | Sekine et al. .................. 349/161 |
| 2006/0103682 | A1 | 5/2006 | Kunimori et al. |
| 2006/0158415 | A1 | 7/2006 | Izumi |
| 2010/0039570 | A1 * | 2/2010 | Shiota ........................... 348/748 |
| 2011/0181791 | A1 * | 7/2011 | Huang et al. .................. 348/744 |
| 2011/0267383 | A1 | 11/2011 | Murakami et al. |

FOREIGN PATENT DOCUMENTS

| JP | 2001-154264 A | 6/2001 |
| JP | 2004-133159 A | 4/2004 |
| JP | 2005-077908 A | 3/2005 |
| JP | 2005-234104 A | 9/2005 |
| JP | 2006-162909 A | 6/2006 |
| JP | 2006-195231 A | 7/2006 |
| WO | WO-2010-134235 A | 11/2010 |

* cited by examiner

*Primary Examiner* — Michael Caley
*Assistant Examiner* — Agnes Dobrowolski
(74) *Attorney, Agent, or Firm* — ALG Intellectual Property, LLC

(57) ABSTRACT

A projector in which a liquid crystal display panel modulates light emitted from a light source and the modulated image light is projected, the projector includes a temperature detector that detects a temperature in the projector and a controller that determines the amount of overdrive based on the temperature detected by the temperature detector in accordance with a driven state of the projector and performs overdrive control on the liquid crystal display panel based on the amount of overdrive.

7 Claims, 7 Drawing Sheets

| DETECTED TEMPERATURE (°C) | FILTER IS USED | | | | | | FILTER IS NOT USED | | | | | |
|---|---|---|---|---|---|---|---|---|---|---|---|---|
| | LOW LUMINANCE | | | HIGH LUMINANCE | | | LOW LUMINANCE | | | HIGH LUMINANCE | | |
| | R | G | B | R | G | B | R | G | B | R | G | B |
| 5~10 | RT1a | GT1a | BT1a | RT1b | GT1b | BT1b | RT1c | GT1c | BT1c | RT1d | GT1d | BT1d |
| 10~15 | RT2a | GT2a | BT2a | RT2b | GT2b | BT2b | RT2c | GT2c | BT2c | RT2d | GT2d | BT2d |
| 15~20 | RT3a | GT3a | BT3a | RT3b | GT3b | BT3b | RT3c | GT3c | BT3c | RT3d | GT3d | BT3d |
| 20~25 | RT4a | GT4a | BT4a | RT4b | GT4b | BT4b | RT4c | GT4c | BT4c | RT4d | GT4d | BT4d |
| 25~30 | RT5a | GT5a | BT5a | RT5b | GT5b | BT5b | RT5c | GT5c | BT5c | RT5d | GT5d | BT5d |
| 30~35 | RT6a | GT6a | BT6a | RT6b | GT6b | BT6b | RT6c | GT6c | BT6c | RT6d | GT6d | BT6d |
| 35~40 | RT7a | GT7a | BT7a | RT7b | GT7b | BT7b | RT7c | GT7c | BT7c | RT7d | GT7d | BT7d |
| 40~45 | RT8a | GT8a | BT8a | RT8b | GT8b | BT8b | RT8c | GT8c | BT8c | RT8d | GT8d | BT8d |

FIG. 5

PROJECTOR AND METHOD FOR CONTROLLING PROJECTOR

BACKGROUND

The entire disclosure of Japanese Patent Application No. 2011-284757, filed Dec. 27, 2011 is expressly incorporated by reference herein.

1. Technical Field

The present invention relates to a projector that projects an image and a method for controlling the projector.

2. Related Art

Among methods for performing overdrive control of related art for improving the responsiveness of a liquid crystal display panel, there is a known method for performing overdrive control with the temperature of the liquid crystal display panel reflected in the overdrive control in consideration of the fact that a responsive characteristic of a liquid crystal display panel changes with temperature (JP-A-2006-195231 and JP-A-2006-162909, for example). According to the method described in JP-A-2006-195231, the amount of overdrive is outputted based on a lookup table and corrected by using a coefficient according to the temperature, and overdrive control is performed based on the corrected amount of overdrive. In the method described in JP-A-2006-162909, a display panel is divided into a plurality of areas, and the amount of overdrive is changed on a divided area basis.

To appropriately reflect the effect of temperature on the response characteristic of a liquid crystal display panel, it is desirable to accurately detect the temperature of the liquid crystal display panel. It is, however, not easy to accurately detect the temperature of a liquid crystal display panel. To this end, for example, the method described in JP-A-2006-162909 requires a plurality of temperature sensors. When the configuration of the related art described above is used in a projector including a liquid crystal display panel to perform overdrive control on the liquid crystal display, the following problems occur: A space where the plurality of temperature sensors are disposed needs to be provided in the projector; and using the plurality of temperature sensors complicates the control of the projector.

SUMMARY

An advantage of some aspects of the invention is to provide a projector capable of appropriately performing overdrive control on a liquid crystal display without having a large number of temperature sensors and a method for controlling the projector.

An aspect of the invention relates to a projector in which a liquid crystal display panel modulates light emitted from a light source and the modulated image light is projected. The projector includes a temperature detector that detects a temperature in the projector and a controller that determines the amount of overdrive based on the temperature detected by the temperature detector in accordance with a driven state of the projector and performs overdrive control on the liquid crystal display panel based on the amount of overdrive.

According to the aspect of the invention, the amount of overdrive can be determined based on a temperature detected in the projector with the driven state of the projector reflected in the amount of overdrive. The projector can therefore perform overdrive control appropriate for an actual state of the liquid crystal display panel without having a large number of temperature sensors.

According to the aspect of the invention, for each of a plurality of liquid crystal display panels, overdrive control appropriate for an actual state of the liquid crystal display panel may be performed.

According to the aspect of the invention, the temperature detected by the temperature detector may be converted into the temperature of the liquid crystal display panel in accordance with the driven state of the projector, and overdrive control may be performed based on the temperature, whereby the projector can perform overdrive control appropriate for an actual state of the liquid crystal display panel. The conversion of the detected temperature into the temperature of the liquid crystal display panel can be performed, for example, by adding or subtracting the difference in temperature between the temperature detector and the liquid crystal display panel according to the driven state of the projector to or from the temperature detected by the temperature detector.

According to the aspect of the invention, the amount of overdrive appropriate for an actual state of the liquid crystal display panel may be obtained by relatively light-load computation.

According to the aspect of the invention, overdrive control appropriate for a more actual state of the liquid crystal display panel may be performed with the state of a filter, which affects the temperature of the liquid crystal display panel, in use or not in use reflected in the amount of overdrive.

According to the aspect of the invention, overdrive control appropriate for a more actual state of the liquid crystal display panel may be performed with the luminance of the light source, which affects the temperature of the liquid crystal display panel, reflected in the amount of overdrive.

According to the aspect of the invention, a substantially actual temperature of the crystal display panel, which is of transmissive type and does not allow a temperature sensor or any other similar device to be disposed in a display area of the liquid crystal display panel or in the vicinity thereof, may be detected, whereby overdrive control appropriate for a more actual state of the liquid crystal display panel can be performed.

According to the aspect of the invention, a temperature sensor may be provided in the vicinity of a location where a temperature close to that of the liquid crystal display panel is obtained, and a temperature detected by the temperature sensor may be used to detect a temperature close to that of the liquid crystal display panel, whereby overdrive control appropriate for an actual state of the liquid crystal display panel can be performed.

According to the aspect of the invention, overdrive control appropriate for an actual state of a liquid crystal display panel can be performed.

BRIEF DESCRIPTION OF THE DRAWINGS

The invention will be described with reference to the accompanying drawings, wherein like numbers reference like elements.

FIG. 2A is a diagram showing a change in data after the overdrive control is performed, and FIG. 2B is a diagram showing the response characteristic of a liquid crystal panel.

FIG. 5 is a descriptive diagram showing an example of a switch table according to which an LUT appropriate for the temperature of each of liquid crystal display panels is selected.

DESCRIPTION OF EXEMPLARY EMBODIMENTS

First Embodiment

An embodiment to which the invention is applied will be described below with reference to the drawings.

Figure 1:
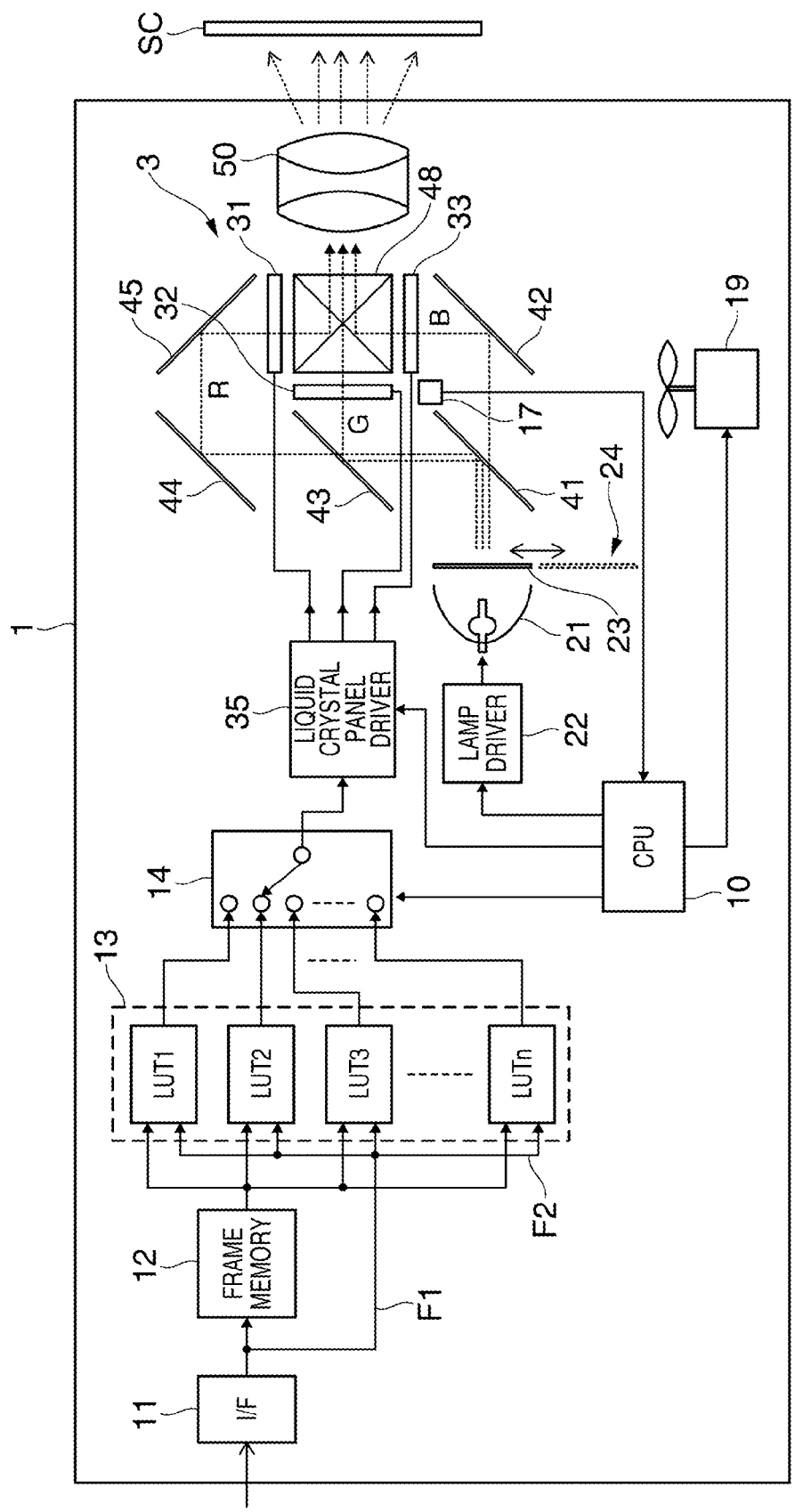
FIG. 1 shows the configuration of a projector according to a first embodiment.

FIG. 1 shows the configuration of a projector 1 according to a first embodiment.

The projector 1 is connected to a PC (personal computer), a DVD player, a television tuner, or a variety of other image supply apparatus (not shown) and projects an image on a screen SC based on image data inputted from any of the image supply apparatus.

The projector 1 is broadly formed of an optical system that forms an optical image and an image processing system that electrically processes an image signal.

The optical system includes the following components: a lamp 21 as a light source formed of a xenon lamp or an ultrahigh-pressure mercury lamp; a filter 23 that converts the spectral characteristic of light emitted from the lamp 2; mirrors 41 to 45 that separate the light emitted from the lamp 21 into RGB three color components; a modulation unit 3 including a liquid crystal display panel 31 that modulates the red light R separated by the mirrors 41 to 45, a liquid crystal display panel 32 that modulates the green light G, and a liquid crystal display panel 33 that modulates the blue light B; a dichroic prism 48 as a light combining system that combines image light components modulated by the liquid crystal display panels 31, 32, and 33; and a projection lens 50 that projects the image light components combined by the dichroic prism 48 toward the screen SC. Each of the mirrors 41 and 43 is a dichroic mirror. The mirror 41 transmits the blue light B and reflects the other wavelength components, and the mirror 43 reflects the green light G and transmits the red light R. Each of the liquid crystal display panels 31, 32, and 33 is a transmissive liquid crystal display panel and connected to a liquid crystal panel driver 35 that drives the liquid crystal display panels 31, 32, and 33. The liquid crystal panel driver 35 draws an image on each of the liquid crystal display panels 31, 32, and 33 under the control of a CPU 10, which will be described later. The optical system of the projector 1 may further include a group of lenses that parallelize the light emitted from the lamp 21, a light-blocking plate that blocks part of the light emitted from the lamp 21 to adjust the amount of light, and a focus mechanism that adjust the image light to be projected through the projection lens 50 onto the screen SC for focusing.

The filter 23 has an effect of attenuating a specific color component contained in the light radiated from the lamp 21 and can, for example, be a filter that attenuates green light to enhance an ability of expressing human skin color. When the filter 23 is used, the amount of light delivered to the liquid crystal display panels 31, 32, and 33 is attenuated. As a result, the amount of heat generated by the liquid crystal display panels 31, 32, and 33 tend to decrease.

On the other hand, a control system of the projector 1 includes the following components: a CPU 10 as a controller that centrally controls the entire projector 1; an interface (I/F) 11 connected to an external image supply apparatus; a frame memory 12 that temporarily holds image data inputted through the interface 11; a lookup table 13 that outputs the amount of overdrive based on image data inputted through the interface 11 and the image data stored in the frame memory 12; and a selector 14 that selects one of lookup tables (LUT 1 to LUT n) contained in the lookup table 13.

When image data is inputted from the external image supply apparatus through the interface 11, the image data is inputted to the frame memory 12 and the LUT 1 to LUT n in the lookup table 13. The projector 1 successively receives pixel data as an input at a predetermined frame rate. Pixel data F1 corresponding to the current frame is, for example, RGB 8-bit data (8 bits for each color component) produced on a pixel basis by sequentially scanning a single-frame image horizontally from above to below and continuously inputted as serial data. The frame memory 12 can store one-frame data or data corresponding to one-frame data. Pixel data stored in the frame memory 12 is read one frame after the image data is stored and inputted as pixel data F2 corresponding to the preceding frame (one frame before the current frame) to the LUT 1 to LUT n in the lookup table 13. The data corresponding to one-frame data described above may be data produced, for example, by compressing one-frame data for memory capacity reduction purposes.

As described above, the pixel data F1 corresponding to the current frame and the pixel data F2 corresponding to the preceding frame are simultaneously inputted to the LUT 1 to LUT n.

The projector 1 further includes a switching mechanism 24 as a switcher that moves the filter 23, as shown in FIG. 1. The switching mechanism 24, which moves the filter 23 under the control of the CPU 10, inserts the filter 23 in the optical path when the filter 23 is in use, whereas retracting the filter 23 from the optical path when the filter 23 is not in use. Further, the lamp 21 is connected to a lamp driver 22 that applies a voltage to the lamp 21 under the control of the CPU 10 to allow the lamp 21 to go on and off. The lamp driver 22 not only allows the lamp 21 to go on and off but also can change the luminance of the lamp 21 to a plurality of different values by changing the voltage applied to the lamp 21.

The projector 1 further includes a cooling fan 19 that cools the lamp 21 and the modulation unit 3. The start and stop operation of the cooling fan 19 and the revolution speed thereof can be adjusted under the control of the CPU 10. The cooling fan 19 is not necessarily disposed at a specific single location, but a plurality of cooling fans 19 can be provided at a location where a power supply circuit (not shown) that supplies electric power to the components that form the projector 1 is present and other locations where a large amount of heat is generated.

Each of the lookup tables LUT 1 to LUT n, which form the lookup table 13, is a memory that stores data used to determine the amount of overdrive of each pixel in a frame based on the pixel data F1 corresponding to the current frame and the pixel data F2 corresponding to the preceding frame. For each of the pixels that form a frame, each of the lookup tables LUT 1 to LUT n that receives the following two parameters: pixel data (grayscale) of the pixel that form part of the inputted pixel data F1 corresponding to the current frame; and pixel data (grayscale) of the pixel in the pixel data F2 corresponding to the preceding frame outputs the amount of overdrive stored in correspondence with the two parameters.

Figure 2A:
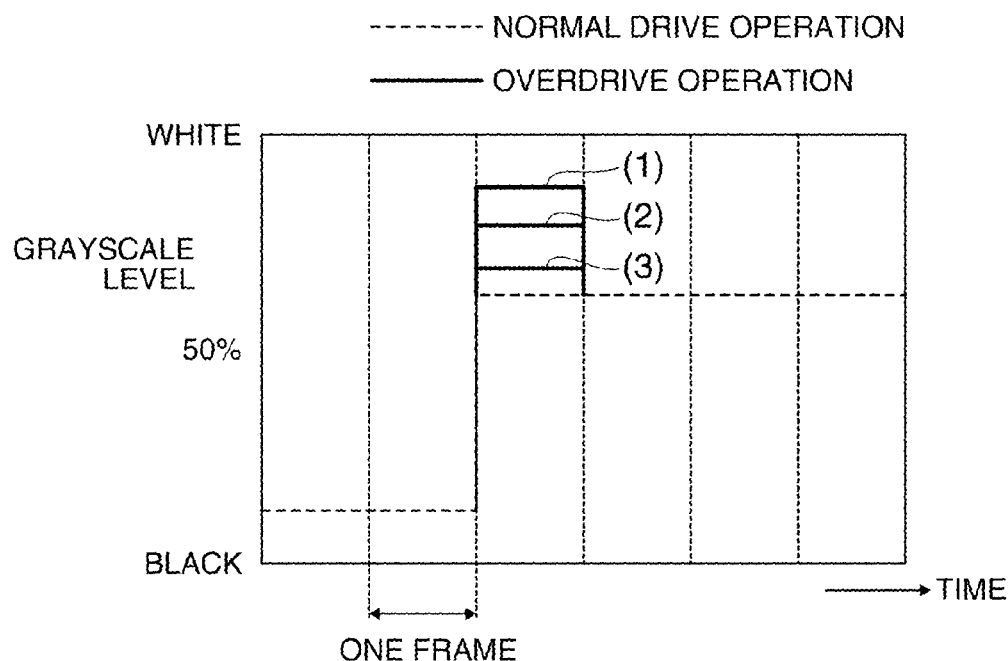
FIGS. 2A and 2B describe how overdrive control is performed.
Figure 2B:
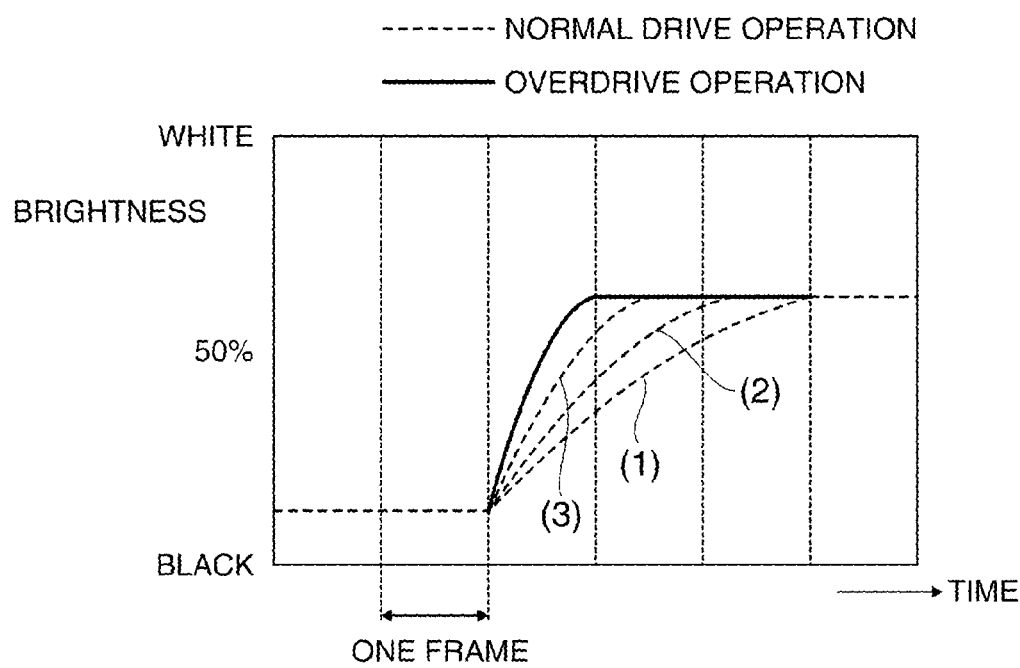

FIGS. 2A and 2B describe how overdrive control is performed. FIG. 2A is a diagram showing a change in data after the overdrive control is performed, and FIG. 2B is a diagram showing examples of the response characteristic of a liquid crystal panel.

The overdrive control is performed to improve the response speed of the luminance of a liquid crystal material by increasing the drive voltage applied to each pixel of a liquid crystal panel. Since the response characteristic of a liquid crystal panel changes with temperature, the overdrive control is so performed that the amount of overdrive changes with the temperature of the liquid crystal material.

For example, FIG. 2A shows pixel data (grayscale) of a pixel. In normal drive operation, pixel data representing an actual grayscale is outputted, as indicated by the broken line in FIG. 2A, and applied to the corresponding pixel. When the current frame data differs from preceding frame data, overdrive control is so performed that pixel data having a grayscale greater than the actual grayscale is outputted, as indicated by (1) to (3) in FIG. 2A. The difference between the greater grayscale and the actual grayscale is the amount of overdrive. When the temperature of the liquid crystal material is low, the amount of overdrive is set at a large value as indicated by (1). When the temperature of the liquid crystal material is high, the amount of overdrive is set at a small value as indicated by (3). When the temperature of the liquid crystal material is intermediate, the amount of overdrive is set at an intermediate value as indicated by (2).

The liquid crystal material responds as follows in normal drive operation as indicated by the broken lines in FIG. 2B: When the temperature of the liquid crystal material is low, the liquid crystal material responds slowly as indicated by (1); and when the temperature of the liquid crystal material is intermediate as indicated by (2) or high as indicated by (3), the response characteristic tends to be improved. In view of the fact described above, setting the amount of overdrive whenever the temperature changes from one of the temperature ranges to another as described above improves the response characteristic of the liquid crystal material as compared with that in normal drive operation and achieves a substantially fixed response characteristic irrespective of the temperature.

The lookup tables LUT 1 to LUT n contained in the lookup table 13 shown in FIG. 1 store data based on which various amounts of overdrive corresponding to various temperatures are outputted, and the lookup tables LUT 1 to LUT n output different amounts of overdrive. The selector 14 selects under the control of the CPU 10 one of the lookup tables LUT 1 to LUT n that is appropriate for the current states of the liquid crystal display panels 31, 32, and 33 driven by the liquid crystal panel driver 35. The selection is made individually for each of the liquid crystal display panels 31, 32, and 33. The liquid crystal panel driver 35 drives each pixel of the liquid crystal display panels 31, 32, and 33 based on data produced by adding the amount of overdrive to the pixel data F1 corresponding to the current frame outputted from the LUT selected by the selector 14 out of the lookup tables LUT 1 to LUT n. An image is thus displayed.

The CPU 10 instructs the selector 14 to select an LUT appropriate for the state of each of the liquid crystal display panels 31, 32, and 33 based on the temperature of each of the liquid crystal display panels 31, 32, and 33. The projector 1 according to the present embodiment does not directly measure (detect) the temperatures of the liquid crystal display panels 31, 32, and 33 but uses only one temperature sensor 17 as a temperature detector that detects the temperatures of the liquid crystal display panels 31, 32, and 33. The projector 1 converts the temperature detected by the temperature sensor 17 into the temperature of each of the liquid crystal display panels 31, 32, and 33 based on whether or not the filter 23 is used and the luminance of the lamp 21.

Figure 3:
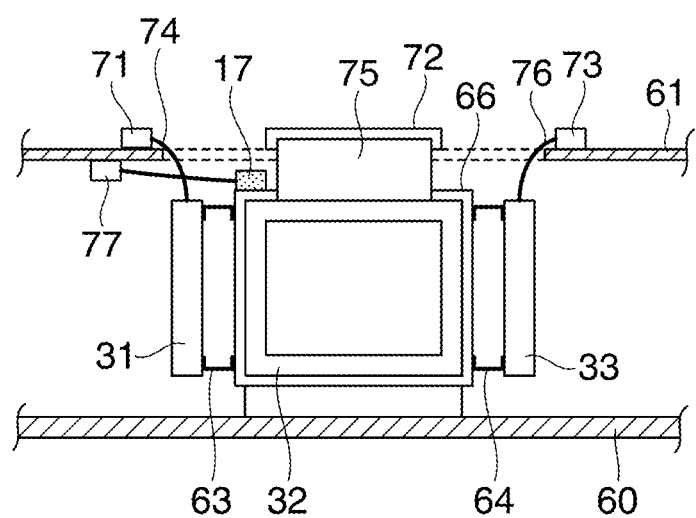
FIG. 3 is a key portion side view showing the configuration and arrangement of liquid crystal display panels and a dichroic prism.

FIG. 3 is a key portion side view showing the configuration and arrangement of the liquid crystal display panels 31, 32, and 33 and the dichroic prism 48.

The liquid crystal display panels 31, 32, and 33 are disposed in an enclosure 66 fixed to a body bottom plate 60 of the projector 1. The enclosure 66 is a container that has a rectangular cross-sectional shape and accommodates and fixes the dichroic prism 48 (FIG. 1). The liquid crystal display panels 31, 32, and 33 are disposed on three side surfaces of the enclosure 66, and the other remaining surface is open and faces the projection lens 50 (FIG. 1). The enclosure 66 is not necessarily made of a specific material and can be made of any material that excels in heat resistance, workability, and heat conductance, such as a metal. A bracket made of a metal is disposed on each of the three side surfaces of the enclosure 66, and the liquid crystal display panels 31, 32, and 33 are fixed to the brackets. FIG. 3 shows a bracket 63 to which the liquid crystal display panel 31 is fixed and a bracket 64 to which the liquid crystal display panel 33 is fixed. The brackets can also be made of any material that excels in heat resistance, workability, and heat conductance, such as a metal.

The enclosure 66 and the brackets 63 and 64 not only fix the liquid crystal display panels 31, 32, and 33 and the dichroic prism 48 to a body of the projector 1 but also determine the positional relationship between the liquid crystal display panels 31, 32, 33 and the dichroic prism 48.

A substrate 61 is fixed in a position above the enclosure 66. The functional portions of the control system shown in FIG. 1 are mounted on the substrate 61. The liquid crystal display panels 31, 32, and 33 are connected to connectors 71, 72, and 73 provided on the substrate 61 via flexible cables 74, 75, and 76, respectively. The connectors 71, 72, and 73 are connected to the liquid crystal panel driver (FIG. 1), and drive voltages are applied to the liquid crystal display panels 31, 32, and 33 via the connectors 71, 72, and 73 and the flexible cables 74, 75, and 76.

The temperature sensor 17 is so attached to the upper surface of the enclosure 66 that the temperature sensor 17 is in intimate contact with the upper surface. The temperature sensor 17 also needs to be so disposed that it does not hamper the projection performed by the projector 1. That is, the temperature sensor 17 needs to be so positioned that it does not overlap with display areas of the liquid crystal display panels 31, 32, and 33, each of which is a transmissive liquid crystal display panels, or the optical paths of light incident on the dichroic prism 48 and light radiated therefrom. Further, the temperature sensor 17 is preferably disposed in a position where conditions that determine the temperature detected by the temperature sensor 17 are similar to those that determine the temperatures of the liquid crystal display panels 31, 32, and 33 because the CPU 10 converts the temperature detected by the temperature sensor 17 into the temperatures of the liquid crystal display panels 31, 32, and 33. The temperature sensor 17 is more preferably disposed in a position which receives the effect of the operating state of the cooling fan 19 (such as start and stop of rotation, revolution speed) as another factor that changes the operating state of the projector 1 along with the liquid crystal display panels 31, 32, and 33.

In the case where the temperature sensor 17 is fixed to the enclosure 66, to which the liquid crystal display panels 31, 32, and 33 are fixed, as shown in FIG. 3, the fact that each of the enclosure 66 and the brackets 63 and 64 is made of a metal preferably prevents the temperature detected by the temperature sensor 17 from deviating from the temperatures of the liquid crystal display panels 31, 32, and 33.

The CPU 10 converts the temperature detected by the temperature sensor 17 into the temperatures of the liquid crystal display panels 31, 32, and 33 based on a switch table produced in advance by performing evaluation temperature measurement that allows evaluation of the relationship between the temperature detected by the temperature sensor 17 and the temperatures of the liquid crystal display panels 31, 32, and 33. The CPU 10 then selects an LUT based on each of converted temperatures.

Figure 4:
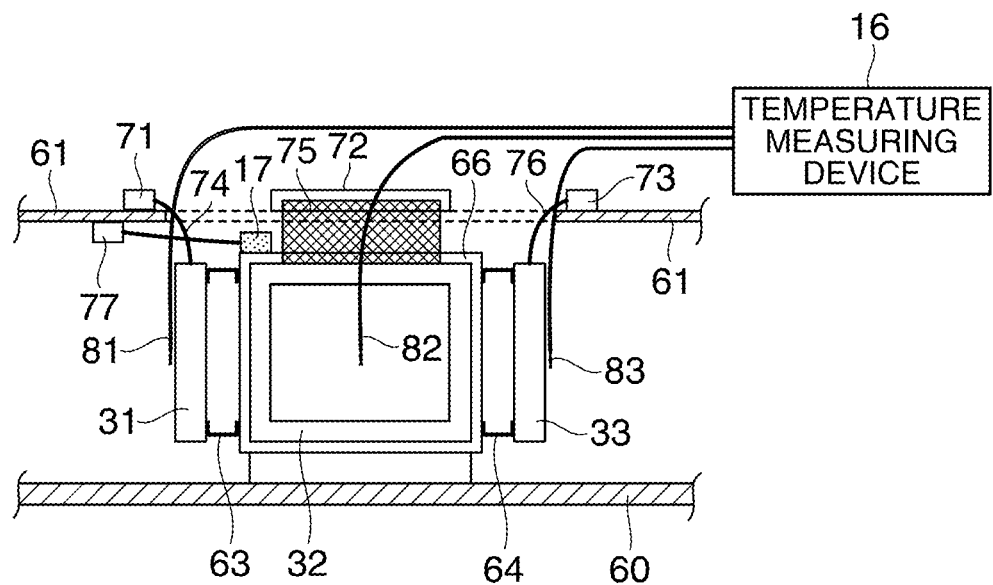
FIG. 4 describes the way evaluation temperature measurement is performed.

FIG. 4 shows the evaluation temperature measurements described above.

When the evaluation temperature measurement is performed, a thermocouple 81 is so placed that it comes into contact or intimate contact with the display surface of the liquid crystal display panel 31, and a temperature measuring device 16 connected to the thermocouple 81 is used to detect the temperature of the liquid crystal display panel 31. Similarly, thermocouples 82 and 83 are so placed that they come into contact or intimate contact with the display surfaces of the liquid crystal display panels 32 and 33, and the temperature measuring device 16 connected to the thermocouples 82 and 83 is used to detect the temperatures of the liquid crystal display panels 32 and 33.

Before the evaluation temperature measurement is performed, the liquid crystal panel driver 35 is used to draw a test image provided in advance on the liquid crystal display panels 31, 32, and 33. The test image is, for example, motion images or a stationary image so adjusted that the average brightness (grayscale) thereof is 50% (gray). By performing the evaluation temperature measurement, the difference between the temperature detected by the temperature sensor 17 and the temperature detected by the temperature measuring device 16 connected to each of the thermocouples 81, 82, and 83 is recorded.

Since the temperatures of the liquid crystal display panels 31, 32, and 33 are affected by the operating state of the projector 1 (luminance of lamp 21, whether or not filter 23 is used or not, and other factors) as described above, the evaluation temperature measurement is performed with the luminance of the lamp 21 changed and the state of the filter 23 switched between in use and not in use. In the present embodiment, the luminance of the lamp 21 can be switched between two values, high luminance and low luminance. In this case, the two choices of the lamp 21, the low luminance and high luminance, and the two choices of the state of the filter 23, in use and not in use, are combined to provide four conditions under which the temperature measurement is performed.

The switch table, according to which an LUT appropriate for the conditions of each of the liquid crystal display panels 31, 32, and 33 is selected, is then created from the temperature detected by the temperature sensor 17 based on the results of the evaluation temperature measurement.

FIG. 5 is a descriptive diagram showing an example of the switch table.

The switch table shown in FIG. 5 contains LUTs appropriate for the liquid crystal display panel 31 (R), LUTs appropriate for the liquid crystal display panel 32 (G), and LUTs appropriate for the liquid crystal display panel 33 (B) set in correspondence with the temperature detected by the temperature sensor 17. The temperature detected by the temperature sensor 17 is classified into temperature ranges each of which has a width of 5 degrees. Further, the LUTs appropriate for the liquid crystal display panels 31, 32, and 33 and classified based on the ranges of the temperature detected by the temperature sensor 17 are also classified into the four operation categories obtained by combining the two states of the filter 23, in use and not in use, and the two states of the lamp 21, the low luminance and the high luminance. Each of the LUTs is expressed by a 4-digit alphanumeric character. For example, "RT1$a$" represents that the LUT is used for R (liquid crystal display panel 31) and has an identification number of "1$a$". Similarly, "GT2$a$" represents that the LUT is used for G (liquid crystal display panel 32) and has an identification number of "2$a$". In the example shown in FIG. 5, 32 LUTs, LUT 1$a$ to LUT 8$d$, are therefore present and used in accordance with the variety of conditions.

For example, when the temperature detected by the temperature sensor 17 ranges from 5 to 10° C. (5° C.≤detected temperature≤10° C.); the filter 23 is "in use;" and the lamp 21 is set at the "low luminance," "RT1$a$," "GT1$a$," and "BT1$a$" are set as appropriate LUTs. Different LUTs can, of course, be set for the liquid crystal display panels 31, 32, and 33 in correspondence with the same range of the temperature detected by the temperature sensor 17 and the same operating state of the projector 1 as those described above.

The switch table can be considered as data that each specify an LUT corresponding to a temperature produced by converting the temperature detected by the temperature sensor 17 in consideration of the luminance of the lamp 21 and whether or not the filter 23 is used.

That is, the evaluation temperature measurement is performed to determine in advance the difference between the temperature detected by the temperature sensor 17 and the actual temperature of each of the liquid crystal display panels 31, 32, and 33 in correspondence with the luminance of the lamp 21. The evaluation temperature measurement is also performed to determine in advance the difference between the temperature detected by the temperature sensor 17 and the actual temperature of each of the liquid crystal display panels 31, 32, and 33 in correspondence with the state of the filter 23, in use or not in use. To perform the overdrive control, the temperature difference corresponding to the luminance of the lamp 21 and the temperature difference corresponding to the state of the filter 23, in use or not in use, are added to or subtracted from the temperature detected by the temperature sensor 17 to provide converted temperatures of the liquid crystal display panels 31, 32, and 33. The amount of overdrive appropriate for the actual temperature of each of the liquid crystal display panels 31, 32, and 33 can then be determined by selecting an LUT corresponding to the thus determined converted value from the LUT 1 to LUT n for each of the liquid crystal display panels 31, 32, and 33. The switch table shown in FIG. 5 is a combination of data for converting the temperature detected by the temperature sensor 17 into the temperature of each of the liquid crystal display panels 31, 32, and 33 based on the temperature difference according to the operating state of the projector 1 and data for selecting an LUT corresponding to the converted temperature. The control operation performed by the CPU 10 to select an LUT based on the switch table shown in FIG. 5 therefore practically corresponds to a process of converting the temperature detected by the temperature sensor 17 into the temperature of each of the liquid crystal display panels 31, 32, and 33 and a process of selecting an LUT corresponding to the converted temperature. The switch table shown in FIG. 5 is, for example, stored in a nonvolatile memory (not shown) connected to the CPU 10.

The CPU 10 acquires the temperature detected by the temperature sensor 17, the luminance of the lamp 21, and the state of the filter 23, in use or not in use, is used during projection of an image inputted through the interface 11, and identifies an LUT appropriate for each of the liquid crystal display panels 31, 32, and 33, instructs the selector 14 to select the identified LUT, and performs overdrive control.

As described above, according to the first embodiment to which the invention is applied, the projector 1, in which the liquid crystal display panels 31, 32, and 33 modulate the light emitted from the lamp 21 and the modulated image light is projected, includes the temperature sensor 17, which detects the temperature in the projector 1, and the CPU 10, which determines the amount of overdrive based on the temperature detected by the temperature sensor 17 in accordance with the driven state of the projector 1 and performs overdrive control on each of the liquid crystal display panels 31, 32, and 33 based on the amount of overdrive. The thus configured projector 1 can determine the amount of overdrive based on the temperature detected in the projector 1 with the driven state of the projector 1 reflected in the amount of overdrive. The projector 1 can therefore perform overdrive control appropriate for actual states of the liquid crystal display panels 31, 32, and 33 without having a large number of temperature sensors.

Further, since the CPU 10 determines the amount of overdrive based on the temperature detected by the temperature sensor 17 for each of the liquid crystal display panels 31, 32, and 33 and performs overdrive control on each of the liquid crystal display panels 31, 32, and 33 based on the amount of overdrive, the thus performed overdrive control can be appropriate for the actual states of the liquid crystal display panels 31, 32, and 33.

Further, since the CPU 10 has a plurality of lookup tables, LUT 1 to LUT n, and uses one of the lookup tables LUT 1 to LUT n according to the driven state of the projector 1 to determine the amount of overdrive based on the temperature detected by the temperature sensor 17, the amount of overdrive appropriate for the actual state of each of the liquid crystal display panels 31, 32, and 33 can be determined by relatively light-load computation.

Further, since the CPU 10 converts the temperature detected by the temperature sensor 17 into the temperature of each of the liquid crystal display panels 31, 32, and 33 in accordance with the driven state of the projector 1, determines the amount of overdrive based on the converted temperature of each of the liquid crystal display panels 31, 32, and 33, and performs overdrive control based on the amount of overdrive, the thus performed overdrive control is appropriate for the actual states of the liquid crystal display panels 31, 32, and 33.

Further, since the projector 1 includes the filter 23, which converts the spectral characteristic of the light emitted from the lamp 21, and the switching mechanism 24, which switches the state of the filter 23 between in use and not in use, and the CPU 10 has a plurality of LUT 1 to LUT n and uses one of the LUT 1 to LUT n that corresponds to the state of the filter 23, in use or not in use, to determine the amount of overdrive based on the temperature detected by the temperature sensor 17, overdrive control appropriate for a more actual state of each of the liquid crystal display panels 31, 32, and 33 can be performed with the state of the filter 23, which affects the temperatures of the liquid crystal display panels 31, 32, and 33, reflected in the amount of overdrive.

Further, since the projector 1 can change the luminance of the lamp 21 to a plurality of different values, and the CPI 10 has a plurality of LUT 1 to LUT n and uses one of the LUT 1 to LUT n that corresponds to the luminance of the lamp 21 to determine the amount of overdrive based on the temperature detected by the temperature sensor 17, overdrive control appropriate for a more actual state of each of the liquid crystal display panels 31, 32, and 33 can be performed with the luminance of the lamp 21, which affects the temperatures of the liquid crystal display panels 31, 32, and 33, reflected in the amount of overdrive.

Further, the projector 1 includes the liquid crystal display panels 31, 32, and 33, each of which is of transmissive type, and detects substantially actual temperatures of the transmissive liquid crystal display panels 31, 32, and 33, which do not allow a temperature sensor or any other similar device to be disposed in the display area of each of the liquid crystal display panels 31, 32, and 33 or in the vicinity thereof, whereby overdrive control appropriate for more actual states of the liquid crystal display panels 31, 32, and 33 can be performed.

Further, since the projector 1 is configured as follows: The dichroic prism 48, which combines light fluxes having passed through the plurality of liquid crystal display panels 31, 32, and 33, is provided; the liquid crystal display panels 31, 32, and 33 are fixed to at least part of the dichroic prism 48 via the enclosure 66 and the brackets, each of which is made of a metal; and the temperature sensor 17 is disposed on a frame member, the temperature detected by the temperature sensor 17 can be used to detect temperatures close to those of the liquid crystal display panels 31, 32, and 33, and overdrive control appropriate for more actual states of the liquid crystal display panels 31, 32, and 33 can be performed.

The first embodiment has been described with reference to the case where the CPU 10 uses the switch table to determine and select an LUT corresponding to the temperature detected by the temperature sensor 17 and practically convert the temperature detected by the temperature sensor 17 based on the LUT.

The invention is not limited to the configuration described above and is applicable, for example, to a configuration in which the amount of overdrive is determined from the temperature detected by the temperature sensor 17; the amount of correction for correcting the determined amount of overdrive is stored; and the amount of overdrive appropriate for each of the liquid crystal display panels 31, 32, and 33 is determined by performing computation based on the amount of correction. The latter case will be described below as a second embodiment.

Second Embodiment

Figure 6:
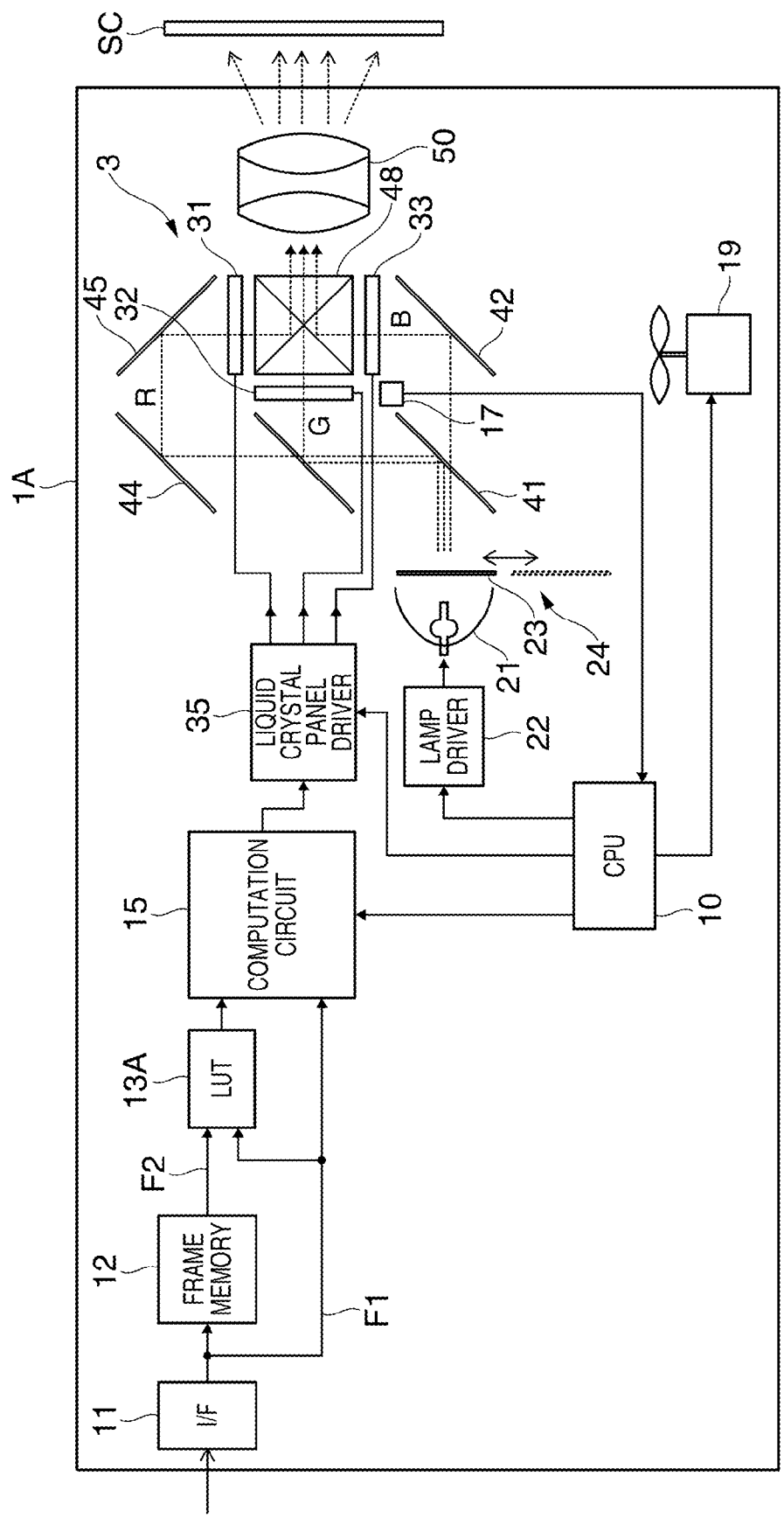
FIG. 6 shows the configuration of a projector according to a second embodiment.

FIG. 6 shows the configuration of a projector 1A according to the second embodiment. In the second embodiment, portions configured in the same manner as in the first embodiment described above have the same reference characters, and no description of these portions will be made.

The projector 1A includes the following components: a lookup table 13A that outputs the amount of overdrive based on pixel data F1 corresponding to the current frame on a current frame and pixel data F2 corresponding to the preceding frame on a preceding frame inputted from an external image supply apparatus; and a computation circuit 15 that performs computation in which the amount of overdrive outputted from the lookup table 13A is corrected. The liquid crystal panel driver 35 drives the liquid crystal display panels 31, 32, and 33 based on the respective corrected amounts of overdrive outputted from the computation circuit 15.

The lookup table 13A may contain a fixed lookup table and store a plurality of lookup tables provided for ranges of temperature detected by the temperature sensor 17 or store a single lookup table common to the overall temperature range.

The CPU 10 determines the amount of correction based on the temperature detected by the temperature sensor 17 and the driven state of the projector 1A and instructs the computation circuit 15 to perform computation based on the determined amount of correction.

Figure 7:
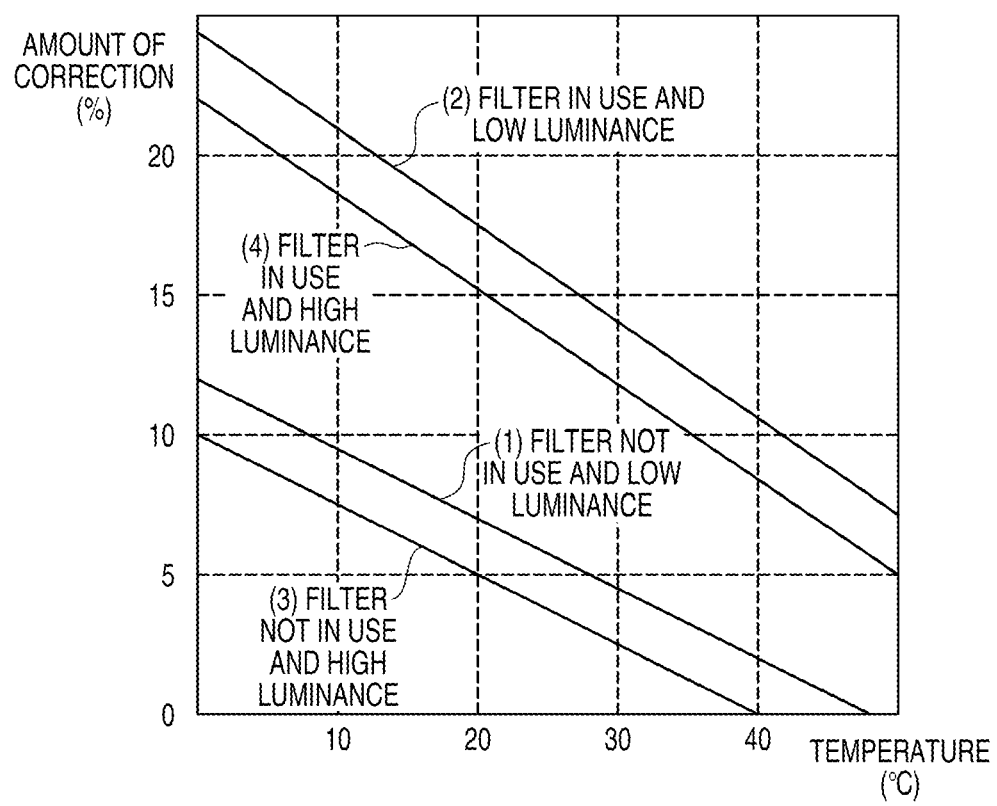
FIG. 7 describes the relationship of the driven state of the projector versus correction data according to the second embodiment.

FIG. 7 describes the relationship of the driven state of the projector 1 versus correction data.

FIG. 7 contains data on the correlation between the temperature detected by the temperature sensor 17 and the amount of correction. As indicated by (1) to (4) in FIG. 7, four types of correction data are provided in accordance with the driven state of the projector 1A. Specifically, (1) represents data used when the filter 23 is not used and the lamp 21 operates at low luminance; (2) represents data used when the filter 23 is used and the lamp 21 operates at low luminance; (3) represents data used when the filter 23 is not used and the lamp 21 operates at high luminance; and (4) represents data used when the filter 23 is used and the lamp 21 operates at high luminance. The data described above are stored, for example, in a nonvolatile memory (not shown) connected to the projector 1A. The data on the amount of correction described above can be determined from results of the evaluation temperature measurement shown in FIG. 5.

The CPU 10 acquires the temperature detected by the temperature sensor 17 and detects the driven state of the projector 1A (luminance of lamp 21 and whether or not filter 23 is used) during projection of an image inputted through the interface 11, and instructs the computation circuit 15 to perform computation in which the amount of overdrive for each of the liquid crystal display panels 31, 32, and 33 is corrected based on the corresponding correction data, and performs overdrive control based on the resultant amount of overdrive. As a result, appropriate overdrive control can be performed without pre-stored data corresponding to the entire range of temperature detected by the temperature sensor 17, whereby the number of LUTs and the data storing memory area can be advantageously reduced.

The embodiments described above are presented only as examples of specific aspects to which the invention is applied and do not limit the invention. The invention is also applicable to an aspect different from the embodiments described above. For example, the above embodiments have been described with reference to the configuration in which the CPU 10 instructs the selector 14 to select an LUT appropriate for each of the liquid crystal display panels 31, 32, and 33 based on the temperature of each of the liquid crystal display panels 31, 32, and 33, the state of the filter 23, in used or not in use, and the luminance of the lamp 21, but the invention is not limited thereto. The CPU 10 may select an LUT based not only on the driven states of the variety of components described above but also on the driven state of the cooling fan 19. Further, if there is another drive operation element of the projector 1 that possibly affects the temperatures of the liquid crystal display panels 31, 32, and 33, the drive operation element may be considered as another index used by the CPI 10 in the LUT selection. Further, in the embodiments described above, the CPU 10 can directly convert the temperature detected by the temperature sensor 17 into the temperature of each of the liquid crystal display panels 31, 32, and 33 based on a preset amount of correction. In this case, the amount of correction may be stored in correspondence with the luminance of the lamp 21 and the state of the filter 23, in use or not in use.

Further, in the configuration of each of the embodiments described above, the projector 1 may project an image stored in a built-in storage device. Further, each of the liquid crystal display panels 31, 32, and 33 provided in the modulation unit 3 is not limited to a transmissive liquid crystal display panel and may alternatively be a reflective liquid crystal display panel. The liquid crystal display panels 31, 32, and 33 may even be replaced with a combination of a single liquid crystal display panel and a color wheel. When only a single liquid crystal display panel is used, a member corresponding to the light combining system, such as the dichroic prism 48, is not required.

Further, the functional portions of the projector 1 shown in FIG. 1 are shown as a functional configuration achieved by cooperation between hardware and software, and specific implementations of the functional portions are not limited to particular ones. Further, the specific detailed configurations of other portions in the projectors 1 and 1A can also be arbitrarily changed to the extent that they do not depart from the substance of the invention.

What is claimed is:

1. A projector in which a liquid crystal display panel modulates light emitted from a light source and the modulated image light is projected, the projector comprising:
   a temperature detector that detects a temperature in the projector;
   a filter that converts a spectral characteristic of the light emitted from the light source;
   a switcher that switches the state of the filter between in use and not in use; and
   a controller that determines an amount of overdrive to be performed on the liquid crystal panel and performs overdrive control on the liquid crystal display panel based on the amount of overdrive,
   wherein the controller determines the amount of overdrive to be performed on the liquid crystal panel based on both the temperature detected by the temperature detector and the state of the filter.

2. The projector according to claim 1,
   wherein the liquid crystal display panel is provided at a plurality of locations, and
   for each of the liquid crystal display panels, the controller determines the amount of overdrive based on the temperature detected by the temperature detector and performs overdrive control on the liquid crystal display panel based on the amount of overdrive.

3. The projector according to claim 1,
   wherein the controller converts the temperature detected by the temperature detector into the temperature of the liquid crystal display panel in accordance with the state of the filter, determines the amount of overdrive based on the converted temperature of the liquid crystal display panel, and performs overdrive control based on the amount of overdrive.

4. The projector according to claim 1, further comprising:
   wherein the controller has a plurality of sets of correction data and uses the correction data corresponding to the state of the filter to determine the amount of overdrive based on the temperature detected by the temperature detector.

5. The projector according to claim 1,
wherein the luminance of the light source is changeable to a plurality of values, and
the controller has a plurality of sets of correction data and uses the correction data corresponding to the luminance of the light source to determine the amount of overdrive based on the temperature detected by the temperature detector.

6. The projector according to claim 1,
wherein the liquid crystal display panel is of transmissive type.

7. The projector according to claim 6,
wherein the liquid crystal display panel is provided at a plurality of locations,
the projector further comprises a light combining system that combines light fluxes having passed through the plurality of liquid crystal display panels,
the liquid crystal display panels are fixed to at least part of the light combining system via a fixing frame made of a metal, and
the temperature detector is a temperature sensor disposed on the fixing frame.

* * * * *